(12) United States Patent
Sugaya

(10) Patent No.: US 7,411,933 B2
(45) Date of Patent: Aug. 12, 2008

(54) RADIO COMMUNICATION DEVICE, RADIO COMMUNICATION METHOD, AND COMPUTER PROGRAM

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 754 days.

(21) Appl. No.: 10/738,418

(22) Filed: Dec. 17, 2003

(65) Prior Publication Data

US 2004/0170135 A1 Sep. 2, 2004

(30) Foreign Application Priority Data

Jan. 7, 2003 (JP) ............................ P2003-001193

(51) Int. Cl.
*H04B 7/212* (2006.01)
(52) U.S. Cl. ...................................... 370/337; 370/329
(58) Field of Classification Search ................. 370/328, 370/329, 337, 338
See application file for complete search history.

(56) References Cited

U.S. PATENT DOCUMENTS

| 7,103,371 | B1 * | 9/2006 | Liu ......................... 455/456.4 |
| 2003/0012176 | A1 * | 1/2003 | Kondylis et al. ............ 370/348 |
| 2005/0190784 | A1 * | 9/2005 | Stine ......................... 370/445 |

FOREIGN PATENT DOCUMENTS

| JP | 10-056417 A | 2/1998 |
| JP | 10-079970 A | 3/1998 |
| JP | 10-209956 A | 8/1998 |
| JP | 10-271091 A | 10/1998 |
| JP | 11-341564 A | 12/1999 |
| JP | 2001-223660 A | 8/2001 |

* cited by examiner

*Primary Examiner*—Wing F. Chan
*Assistant Examiner*—Anthony Sol
(74) *Attorney, Agent, or Firm*—Lerner, David, Littenberg, Krumholz & Mentlik, LLP

(57) ABSTRACT

A radio communication device wherein, by performing a channel reservation, an arbitrary radio communication with other surrounding radio communication devices may be carried out by setting up a receiving slot according to the amount of receiving data. Each radio communication device may only manage the number of its own receiving slots so as to secure the channel required for communication by its own determination, without needing a process that is accurately synchronous with other radio communication devices. The radio communication device on the data transmission side monitors, by receiving a beacon, an increase in the number of the receiving slots of the radio communication device on the reception side, so as to transmit the data immediately when the number of the receiving slots increases. The reception acknowledgement information from the reception side radio communication device is written in the beacon and returned.

10 Claims, 11 Drawing Sheets

RADIO COMMUNICATION DEVICE, RADIO COMMUNICATION METHOD, AND COMPUTER PROGRAM

CROSS REFERENCE TO RELATED APPLICATIONS

The present document is based on Japanese Priority Application JP2003-001193, filed in the Japanese Patent Office on Jan. 7, 2003, the contents of which being incorporated herein by reference to the extent permitted by law.

BACKGROUND OF THE INVENTION

1. Field of the Invention

This invention relates to a radio communication device and a radio communication method.

2. Description of the Related Art

In conventional communication systems of a time division multiple access (TDMA) type, such as a portable phone, a network structure is generally used in which a base station is disposed in every predetermined area and a terminal unit is provided under the base station.

In this case, an access method is used in which the base station controls a transmission frame and a slot so that a channel by which each terminal unit can perform transmission or reception is strictly specified.

In a slot division type channel reservation communication system, a network structure is generally used in which a device of an access point is disposed in the center of the network and the terminal unit is provided thereunder.

In this case, also, an access method is used in which the access point consolidates the transmission frame and the slot so that the channel by which each terminal unit can perform transmission or reception is specified strictly.

As an example of such a conventional channel reservation control method, an access method is generally used in which, by means of a channel called a random access slot, the terminal unit sends a reservation request for a channel required for communication to the base station or the access point, so that the terminal unit may carry out communication in the channel specified by the base station or the access point.

On the other hand, as a radio network structure under the IEEE 802.11 standard, a method in which all terminal units perform access control asynchronously without providing a specific base station has been suggested.

As a radio access control method in the radio network under the IEEE 802.11 standard, a collision avoidance method by a carrier sense multiplex access (CSMA/CA) is widely known.

SUMMARY OF THE INVENTION

However, the conventional channel reservation control method of a radio communication system utilized by carrying out the time division multiplexing with respect to a wireless transmission channel has a disadvantage that radio communication resources cannot be controlled if the device called the base station or the access point is not disposed in the center of the network.

Further, each terminal unit existing in the network has disadvantages that the transmission channel cannot be used without instructions from a device called the base stations or the access point, and a complex channel reservation protocol is required to receive the instructions.

A typical method of reservation protocol has a disadvantage that, using a channel called the random access slot, the terminal unit must send the reservation request for the channel required for communication to the base station or the access point, and there is a possibility that its own request may collide with a request from another terminal.

In addition, unless the base station or the access point notifies the terminal that the use of the transmission channel has become available, the terminal unit cannot transmit data, thus causing a communication delay when channel reservation is time consuming.

Such a conventional channel reservation protocol has a disadvantage that a reliable wireless transmission channel which hardly considers an interference disturbance from another radio system is required, because the channel reservation cannot be performed unless connection between the base station and the terminal station is always guaranteed.

In addition, the conventional reservation protocol has a drwaback that a reservation operation of the time division multiplexing cannot be performed if a device at transmission side and a device at reception side are not mutually synchronized, therefore it is said that a device as a control station is required in order to synchronize both devices.

Also, a conventional channel reservation mechanism depends on reservation processing by a device of an information transmitter and therefore has a disadvantage that an exact channel reservation cannot be performed unless the transmitter device estimates a reservation amount in advance, in order to start the reservation processing.

Thus, some applications in which an amount of transmission changes may not provide reliable transmission unless the channel more than necessary is reserved, so that it contains a channel which is not actually used for transmission or a redundant channel is reserved, thus having a disadvantage that an efficiency of the transmission channel is reduced.

As to the radio access control method in the radio network under the IEEE 802.11 standard, the collision avoidance method by the carrier sense multiplex access (CSMA/CA) provides redundant carrier sense time before information transmission in order to detect that the information transmission of another surrounding communication device is not affected.

Further, when another communication device is performing the information transmission, the transmitting device's transmission is obstructed, thus making it difficult to perform channel reservation transmission.

The present invention aims to provide a radio communication device and a radio communication method which can perform transmission control of channel reservation communication for the time division multiplexing with only arbitrary terminal units, even if there is no device called the base station or the access point, and a computer program for implementing the method.

In addition, the present invention aims to provide a radio communication device and a radio communication method which can perform communication by means of a narrower channel (reduced reservation) when there is less data to be transmitted by each terminal unit, and a wider channel (increased reservation) in the case of relatively great volume of data to be transmitted, so as to perform a channel reservation control corresponding to the amount of information to be transmitted, and a computer program for implementing the method.

Thirdly, the present invention aims to provide a radio communication device and a radio communication method which can perform the channel reservation easily, while verifying a required amount of data communication so as to adapt to an application with which an amount of data communication changes between communication devices of an information transmitter and an information receiver, and a computer program for implementing a related method.

According to a preferred embodiment of the present invention, there is provided a radio communication apparatus for radio-communicating with another radio communication apparatus, including: frame setting means for setting a frame period and a slot as predetermined time units; receiving slot setting means for setting at least one receiving slot among receiving slots received during the frame period; notification means for notifying information of the receiving slot via a beacon signal; and slot increasing means for increasing receiving slots, if receiving a signal from another radio communication apparatus at the receiving slot.

According to another preferred embodiment of the present invention, there is provided a radio communication apparatus for radio-communicating wi A radio communication apparatus for radio-communicating with another radio communication apparatus, including: receiving means for receiving a beacon signal from another radio communication apparatus; receiving slot detection means for detecting a receiving slot of the other radio communication apparatus from the received beacon signal; and slot increasing means for increasing receiving slots at a timing that does not coincide with the receiving slots detected at the receiving slot detection means.

According to still another preferred embodiment of the present invention, there is provided a radio communication apparatus for radio-communicating with another radio communication apparatus, including: frame setting means for setting a frame period and a slot as predetermined time units; receiving slot setting means for setting a plurality of receiving slots received during the frame period; notification means for notifying information of the receiving slot set by the setting means via a beacon signal; and slot decreasing means for decreasing the plurality of receiving slots to a minimum of one, if there is no signal reception from another radio communication apparatus detected at the receiving slot set by the setting means.

According to another preferred embodiment of the present invention, there is provided a radio communication apparatus for radio-communicating with another radio communication apparatus, including: receiving means for receiving a beacon signal from another radio communication apparatus; receiving slot detection means for detecting a receiving slot of the other radio communication apparatus from the received beacon signal; and transmitting means for transmitting information via a new receiving slot if a change occurs to the receiving slot, after information is transmitted against a receiving slot of the other radio communication apparatus.

According to another preferred embodiment of the present invention, there is provided a radio communication apparatus for radio-communicating with another radio communication apparatus, including: frame setting means for setting a frame period and a slot as predetermined time units; receiving slot setting means for setting at least one receiving slot among receiving slots received during the frame period; and notification means for notifying information of the receiving slot set by the setting means via a beacon signal; wherein the notification means notifies a reception acknowledgement via a beacon, if receiving a signal from another radio communication apparatus at the receiving slot set by the setting means.

According to another preferred embodiment of the present invention, there is provided a radio communication method for performing radio communication between a plurality of radio communication apparatuses, the method including the steps of: setting a frame period of predetermined time through a radio communication apparatus; preparing a slot of predetermined time unit during the frame period set in the setting step; setting at least one receiving slot through each of the radio communication apparatuses; and increasing one's own receiving slots, if there is reception at the receiving slot set in the setting step.

According to another preferred embodiment of the present invention, there is provided a radio communication method for performing radio communication between a plurality of radio communication apparatuses, the method including the steps of: setting a frame period of predetermined time through a radio communication apparatus; collecting a beacon from another adjacent radio communication apparatus through a receiving operation performed throughout the frame period set in the setting step; storing receiving slot information of the other adjacent radio communication apparatus from the beacon; and increasing one's own receiving slots at a timing that does not coincide with the receiving slots stored by the storing step.

According to another preferred embodiment of the present invention, there is provided a radio communication method for performing radio communication between a plurality of radio communication apparatuses, the method including the steps of: setting a frame period of predetermined time through a radio communication apparatus; preparing a slot of predetermined time unit during the frame period set in the setting step; setting a plurality of receiving slots for data reception through each of the radio communication apparatuses; and decreasing one's own receiving slots to a minimum of one, if there is no reception at the receiving slots set in the setting step.

According to still another preferred embodiment of the present invention, there is provided a radio communication method for performing radio communication between a plurality of radio communication apparatuses, the method including the steps of: setting a frame period of predetermined time through a radio communication apparatus; collecting a beacon from another adjacent radio communication apparatus through a receiving operation performed throughout the frame period set in the setting step; storing receiving slot information of the other adjacent radio communication apparatus from the beacon; receiving a beacon signal from a radio communication apparatus if information is transmitted via a receiving slot of the radio communication apparatus; and transmitting information via another receiving slot, if a change occurs in an allocation of a receiving slot.

According to another preferred embodiment of the present invention, there is provided a radio communication method for performing radio communication between a plurality of radio communication apparatuses, the method including the steps of: setting a frame period of predetermined time through a radio communication apparatus; preparing a slot of predetermined time unit during the frame period set in the setting step; setting at least one receiving slot through each of the radio communication apparatuses; notifying a position of the receiving slot set in the setting step via a beacon; and notifying reception acknowledgement, if receiving a signal from another radio communication apparatus.

According to another preferred embodiment of the present invention, there is provided a computer-readable program for executing a process of radio communication with another radio communication apparatus on a computer system, the program including the step of: increasing receiving slots, if there is reception in at least one receiving slot set by one's own radio communication apparatus.

According to another preferred embodiment of the present invention, there is provided a computer-readable program for executing a process of radio communication with another radio communication apparatus on a computer system, the program including the step of: decreasing receiving slots to a minimum of one, if there is no reception at any receiving slot set by one's own radio communication apparatus.

According to another preferred embodiment of the present invention, there is provided a computer-readable program for executing a process of radio communication with another radio communication apparatus on a computer system, the program including the step of: transmitting information via another receiving slot, if a change occurs in an allocation of a receiving slot of a receiving radio communication apparatus.

According to another preferred embodiment of the present invention, there is provided a computer-readable program, for executing a process of radio communication with another radio communication apparatus on a computer system, the program including the step of: notifying reception acknowledgement, if a receiving slot set by one's own radio communication apparatus receives a signal from another radio communication apparatus.

According to the preferred embodiments of the present invention, without providing a network control station, each communication device autonomously manages a reservation status of receiving slots and performs a reservation addition process of the receiving slots as needed.

In this case, each communication device defines the receiving slots independently, and changes the number of receiving slots so as to adaptively adjust the amount of reservation transmission.

In the radio communication device according to the preferred embodiments of the present invention, when the receiving slot specified in advance has reception, the number of receiving slots of the radio communication device is increased so as to efficiently receive data from the application different in the amount of transmission.

In addition, in the radio communication device according to the preferred embodiments of the present invention, when there is no reception in a plurality of set-up (or setting) receiving slots, the number of the receiving slots of the radio communication device is reduced so as to improve a repetition efficiency of the wireless transmission channel.

Still further, according to reception conditions, it is possible to provide power-saving communication by increasing or decreasing the number of the receiving slots.

By notifying an increase or decrease in the number of the receiving slots as beacon information, not only the radio communication device of the information transmitter but also a surrounding radio communication device may be notified of a status of usage of the slots.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which.

DESCRIPTION OF THE PREFERRED
EMBODIMENTS OF THE INVENTION

Figure 1:
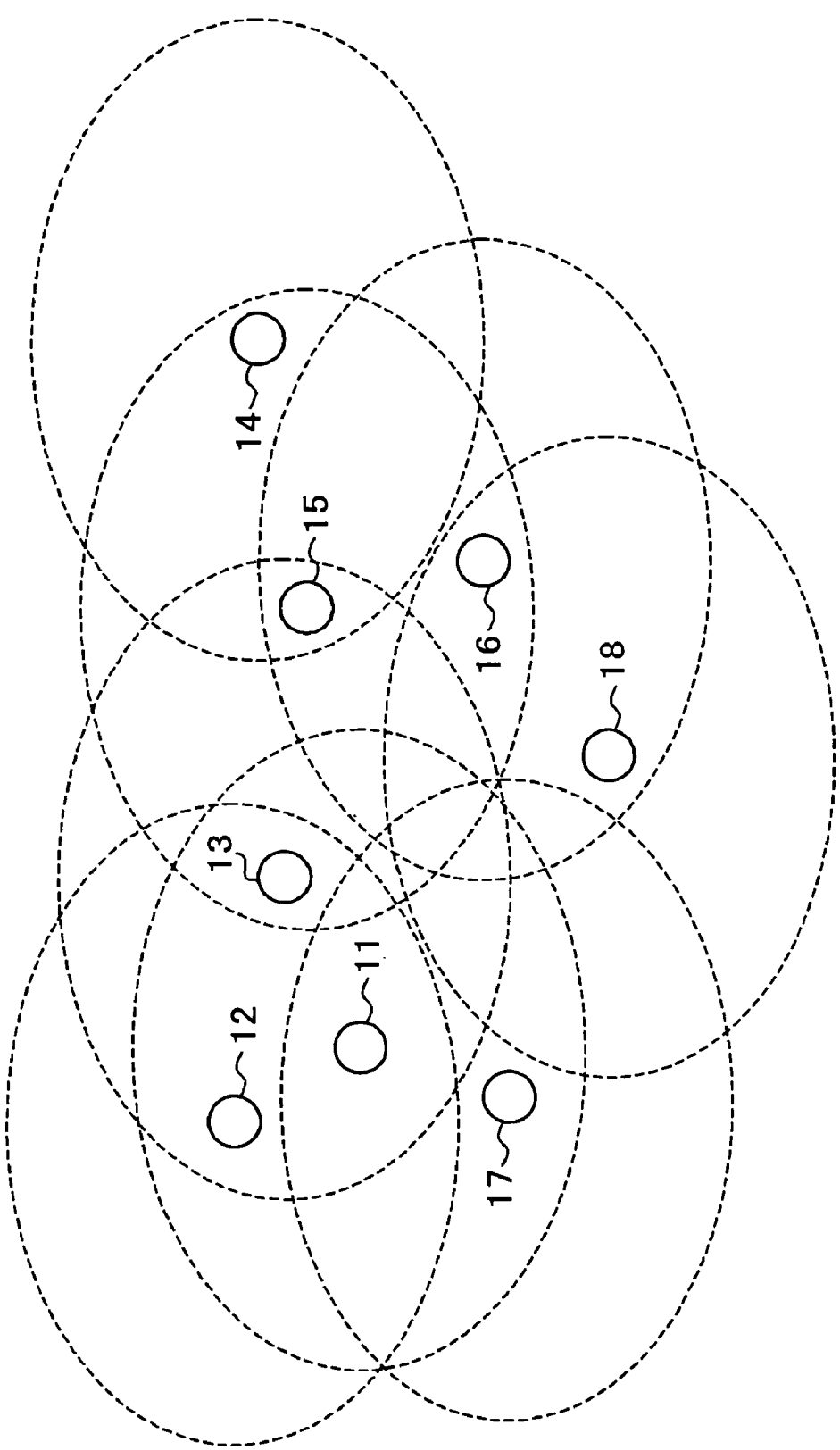
FIG. 1 is a schematic view showing an example of arrangement of communication devices which constitute a radio communication system according to a preferred embodiment of the present invention.

Now, with reference to accompanying drawings, preferred embodiments of the present invention will be described as follows:

FIG. 1 is a schematic view showing an example of arrangement of communication devices which constitute a radio communication system according to a preferred embodiment of the present invention.

The radio communication system 10 of the example of FIG. 1 is a case where there are eight radio communication devices 11 to 18.

In other words, FIG. 1 shows that the radio communication devices 11 to 18 are distributed in the same space.

Further, in FIG. 1 a broken line indicates a communication area of each of the radio communication devices 11 to 18. One radio communication device may communicate with another radio communication device within the area, and the broken line also defines the area as an area in which a signal transmitted by the one radio communication device itself may interfere with others.

In the radio communication system 10 of FIG. 1, the radio communication device 11 is located in an area where it may communicate with the neighboring (adjacent) radio communication devices 12, 13, and 17.

The radio communication device 12 is located in an area where it may communicate with the neighboring radio communication devices 11 and 13.

The radio communication device 13 is located in an area where it may communicate with the neighboring radio communication devices 11, 12, and 15.

The radio communication device 14 is located in an area where it may communicate with the neighboring radio communication device 15.

The radio communication device 15 is located in an area where it may communicate with the neighboring radio communication devices 13, 14, and 16.

The radio communication device 16 is located in an area where it may communicate with the neighboring radio communication devices 15 and 18.

The radio communication device 17 is located in an area where it may communicate with the neighboring radio communication device 11.

The radio communication device 18 is located in an area where it may communicate with the neighboring radio communication device 16.

In the radio communication system 10 according to the preferred embodiment of the present invention, each of the radio communication devices 11 to 18 employs an access control method of using one radio transmission channel by time division taking into consideration a mutual influence between another neighboring radio communication device and itself.

Figure 2:
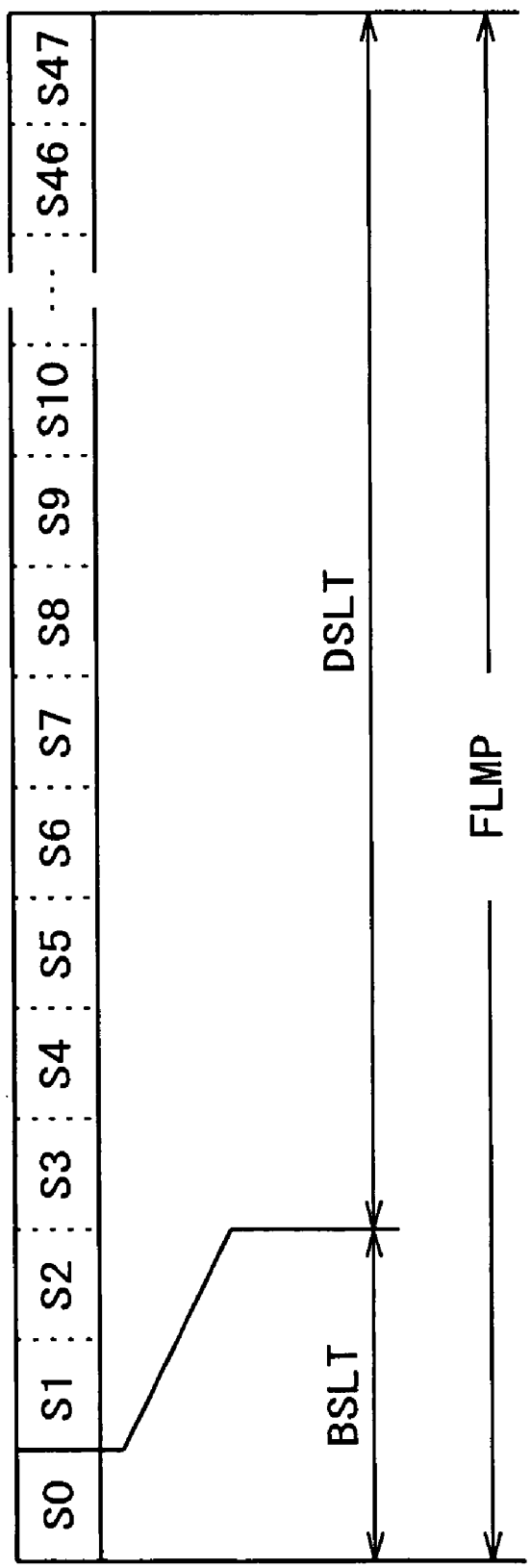
FIG. 2 is a diagram showing a structure of a frame period and a structure of a scanning period employed by the radio communication system according to the preferred embodiment of the present invention of the present invention.

FIG. 2 is a diagram showing a structure of a frame period and a structure of a scanning period employed by the radio communication system according to the preferred embodiment.

In the preferred embodiment, as shown in FIG. 2, a beacon slot for transmitting a beacon at a predetermined timing (S0: BSLT) and data slots (S1 to S47: DSLT) for receiving data are arranged. A group of these 48 slots constitute one frame period FLMP. The frame period FLMP is set to 30 ms to 40 ms, for example.

The beacon slot BSLT in the frame period FLMP is provided in the position in which the radio communication device transmits its own beacon signal.

The data slots DSLT in the frame period FLMP are used for explicitly showing that the beacon transmitting position of the radio communication device itself is set to a position corresponding to which timing, in order to avoid a collision with other radio communication devices which exist around the radio communication device itself when at least one receiving slot is set up.

The number of the data slots DSLT according to the preferred embodiment of the present invention may be increased or decreased if appropriate.

It should be understood that a parameter of the number of slots as shown is set up for convenience and it is not limited to the number as shown.

FIGS. 3(A) to 3(F) are charts showing examples of slot arrangements in case a plurality of radio communication devices are arranged adjacent to one another.

These examples show that a certain radio communication device is arranged among surrounding radio communication devices so as to avoid a mutual collision with others, while accommodating the beacon transmitting positions and the receiving slots to be used.

It should be understood that these examples show that the receiving slots RSLT are arranged sparsely, however, the receiving slots may be arranged densely and continuously.

Figure 3:
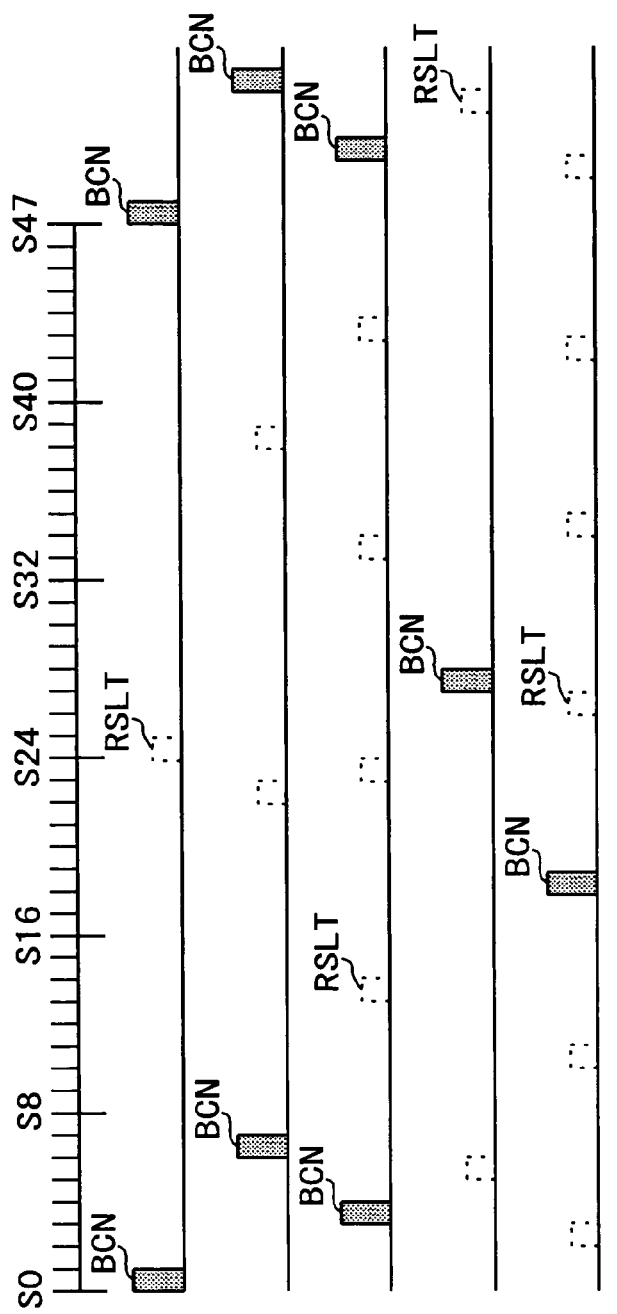
FIGS. 3(A) to 3(F) are charts showing a series of operations of the radio communication system 10 of FIG. 1 chronologically and specifically.

FIG. 3(A) shows a frame including the beacon slots and the data slots. FIG. 3(B), FIG. 3(C), FIG. 3(D), FIG. 3(E), and FIG. 3(F) respectively show a communication state of the radio communication device 11, a communication state of the radio communication device 12, a communication state of the radio communication device 13, a communication state of the radio communication device 14, and a communication state of the radio communication device 15.

In FIGS. 3(B) to 3(F), BCN and RSLT each denote the beacons and the receiving slots.

Based on the frame of the radio communication device 11, assuming the beacon transmitting position to be S0, the communication device 11 disposes the receiving slot at S24 in the center of the frame as shown in FIGS. 3(A) and 3(B).

As shown in FIGS. 3(A) and 3(C), the radio communication device 12 transmits the beacon in the position of S6 of the frame of the radio communication device 11, and disposes two receiving slots RSLT. The receiving slots RSLT are notified as S16 and S32 in the frame of the radio communication device 12, and correspond to positions S22 and S38 in the frame of the radio communication device 11.

As shown in FIGS. 3(A) and 3(D) the radio communication device 13 transmits the beacon in the position S3 of the frame of the radio communication device 11, and disposes four receiving slots RSLT sparsely. These receiving slots RSLT are notified as S10, S20, S30, and S40 in the frame of the radio communication device 13, and correspond to the positions S13, S23, S33, and S43 in the frame of the radio communication device 11.

As shown in FIGS. 3(A) and 3(E) the radio communication device 14 transmits the beacon in the position S27 of the frame of the radio communication device 11, and disposes only one receiving slot RSLT. The receiving slot RSLT is notified as S26 in the frame of the radio communication device 14 and corresponds to the position S5 in the frame of a radio communication device 11.

As shown in FIGS. 3(A) and 3(F) the radio communication device 15 transmits the beacon in the position S18 of the frame of the radio communication device 11, and disposes five receiving slots RSLT sparsely. These receiving slots RSLT are notified as S8, S16, S24, S32, and S40 in the frame of the radio communication device 15, and correspond to the positions S2, S10, S26, S34, and S42 in the frame of the radio communication device 11.

Figure 4:
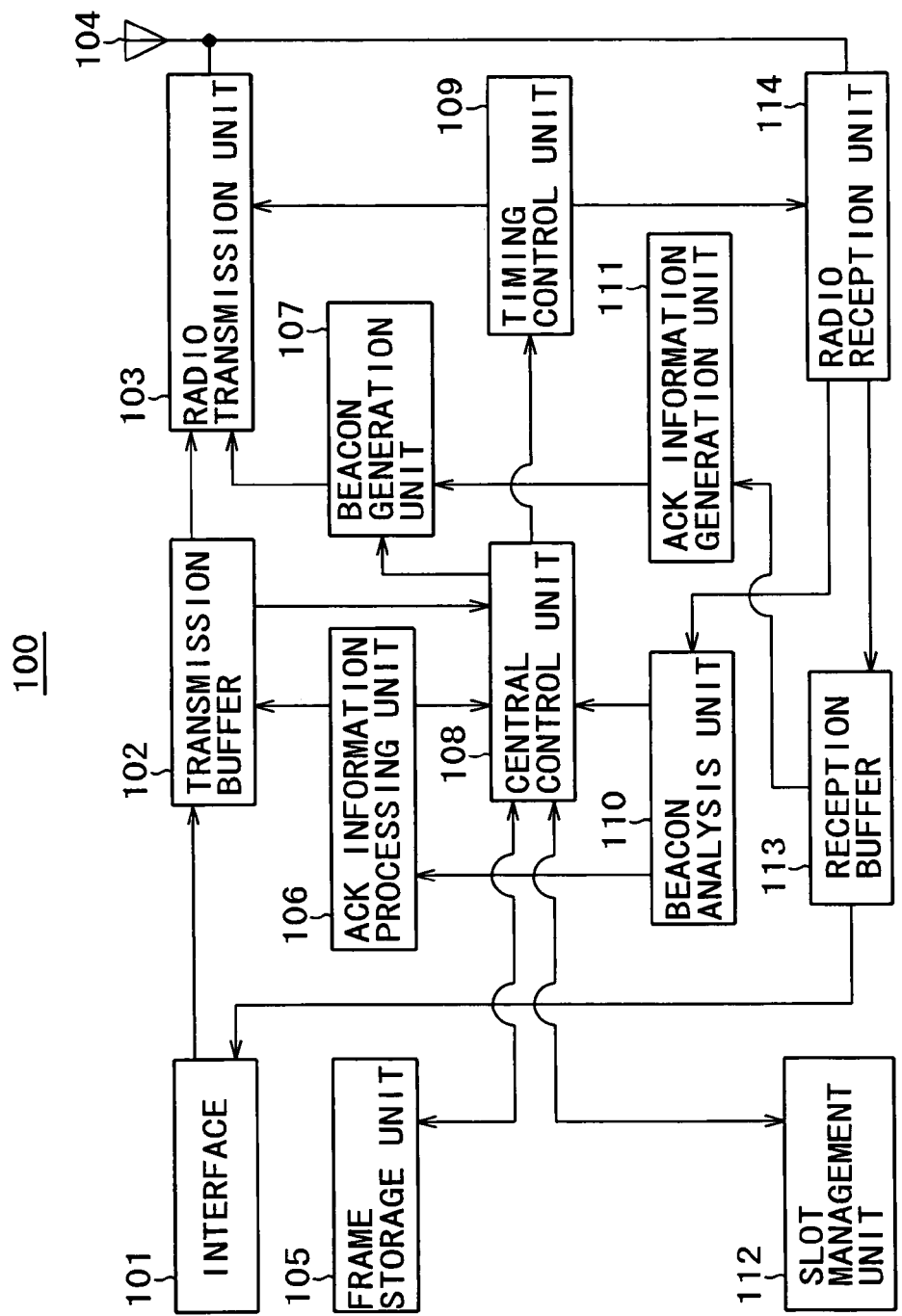
FIG. 4 is a block diagram showing a preferred embodiment of the radio communication device according to a preferred embodiment of the present invention.

Now, an example of particular structure of the radio communication device according to the preferred embodiment of the present invention will be described as follows:

FIG. 4 is a block diagram showing a preferred embodiment of the present invention of the radio communication device according to a preferred embodiment of the present invention.

Since the radio communication devices 11 to 18 of FIG. 1 have similar structures, the radio communication device in FIG. 4 is represented by reference numeral 100.

The radio communication device 100 includes an interface 101, a transmission buffer 102, a radio transmission unit 103, an antenna 104, a frame storage unit 105, an information processing unit 106, a beacon generation unit 107, a central control unit 108, a timing control unit 109, a beacon analysis unit 110, an ACK information generation unit 111, a slot management unit 112, a reception buffer 113, and a radio reception unit 114.

The interface 101 exchanges varieties of information data between a device (not shown) to be connected to the radio communication device 100 and the transmission buffer 102 and the reception buffer 113.

The transmission buffer 102 temporarily stores the data received from the device to be connected when transmitting by radio.

In order to transmit, by radio, the data temporarily stored in the transmission buffer 102, the radio transmission unit 103 converts the data into an ultra wideband signal, for example, so as to be emitted to a transmission medium (the atmosphere) through the antenna 104 at a timing specified by the timing control unit 109.

The antenna 104 transmits, by radio, the signal from the radio transmission unit 103 to other radio communication devices, and collects signals sent from other radio communication devices so as to be supplied to the radio reception unit 114.

Under control of the central control unit 108, the frame storage unit 105 stores frame period information set up by the radio communication device in order to carry out communication.

Receiving the data after transmission, the ACK information processing unit 106 derives ACK information from the beacon analyzed in the beacon analysis unit 110. Based on the results, the central control unit 108 causes the transmission buffer 102 to resend the data.

The beacon generation unit 107 generates a beacon signal based on an arrangement state of the receiving slots and the ACK information about the data reception etc.

The central control unit 108 performs sequence management of a series of data communication in the whole device and scans for available receiving slots. The central control unit 108 has an ACK return timer. If there is any data to be transmitted to the transmission buffer 102, it determines whether or not it is necessary to return ACK information with respect to the data. Only when the return is necessary, the ACK return timer is started and controlled to prepare for the ACK return from a counterpart.

According to instructions from the central control unit 108, the timing control unit 109 specifies timing for carrying out a scanning operation, a reception operation of a predetermined slot, and a transmitting operation for the radio transmission unit 103 and the radio reception unit 114.

The beacon analysis unit 110 analyzes for the timing and receiving slot positions in the received beacon signal by scanning, and outputs the analysis results to the ACK information processing unit 106 and the central control unit 108.

When receiving data from a radio communication device, the ACK information generation unit 111 generates reception acknowledgement information of the data and supplies the information to the beacon generation unit 107.

The slot management unit 112 manages slots of a data receiver and available and free slots in the surrounding radio communication device so as to store data.

The reception buffer 113 stores the data received at the timing of the receiving slot which is set up by the radio communication device 100.

The radio reception unit 114 receives signals such as data and beacons sent from other radio communication devices at the predetermined timing specified by the timing control unit 109 and supplies the signals to the reception buffer 113 and the beacon analysis unit 110.

Figure 5:
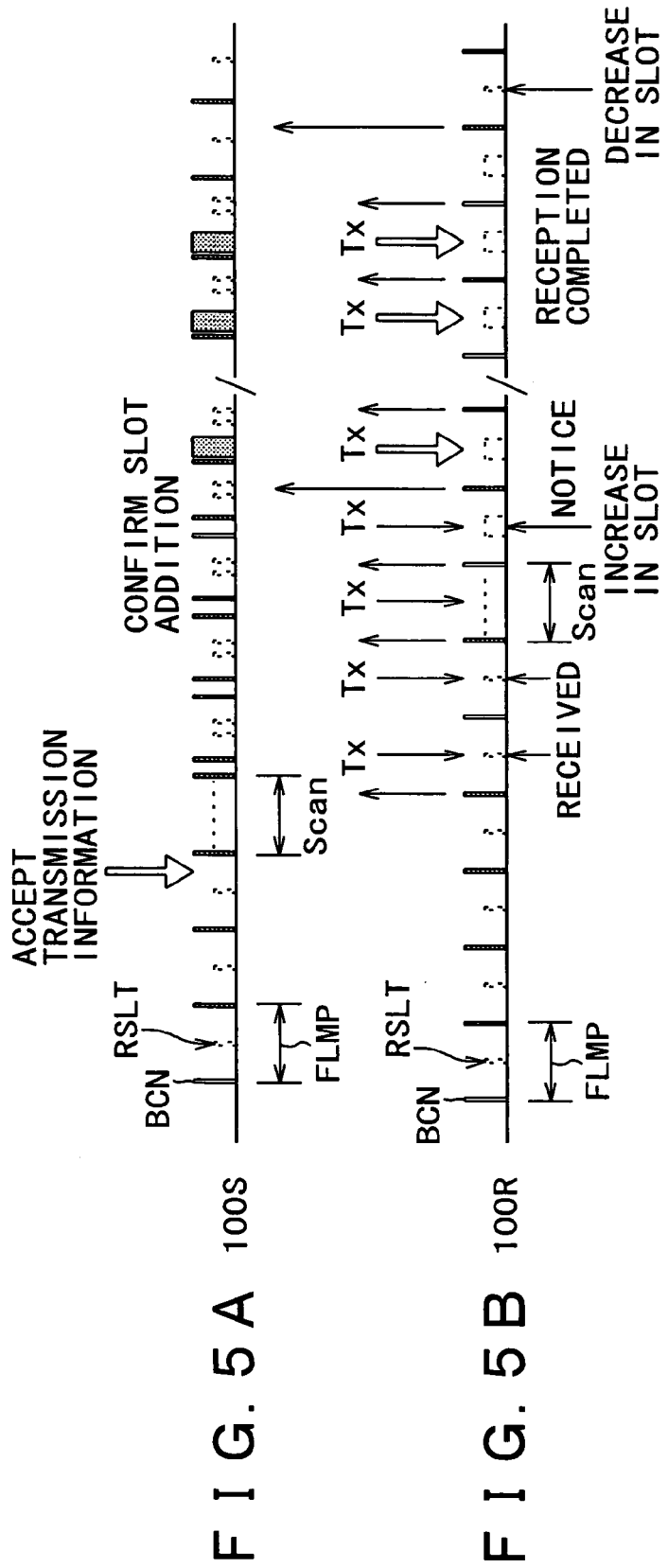
FIGS. 5(A) and 5(B) are charts for explaining an example of a radio communication method according to a preferred embodiment of the present invention.

FIGS. 5(A) and 5(B) are charts for explaining an example of the radio communication method according to a preferred embodiment of the present invention.

FIG. 5(A) shows a change in operation over time in a communication transmitter device 100S, and FIG. 5(B) shows a change over time in operation in a communication receiver device 100R.

In both radio communication devices, predetermined frame periods FLMP are controlled by repeating beacon signals and the receiving slots RSLT are disposed in the frame periods FLMP.

When communication transmitter device 100S receives transmitting information, the communication transmitter device performs a scanning operation (Scan) as shown in FIG. 5(A).

The communication transmitter device 100S receives the beacon signal BCN from the information receiver by means of the scanning operation and stores a data of the position of the receiving slot RSLT. Then, it transmits information in accordance with the timing of the receiving slot RSLT of the information receiver.

Further, the communication transmitter device 100S repeatedly receives the beacon signal BCN of the information receiver, so as to correspond to an increase in the number of the receiving slots RSLT of the communication receiver device 100R and transmit many information data in a short period of time.

In addition, if the ACK information for confirming the receipt is written in the beacon signal BCN, a resending process may be carried out based on the information.

On the other hand, as shown in FIG. 5(B), when the communication receiver device 100R receives information in the receiving slot set up by itself, it carries out the scanning operation (Scan) so as to search for a free slot in a position which does not collide with the receiving slots of other surrounding radio communication devices.

When a free slot is found, the free slot is set up as a receiving slot RSLT and the data of the increase in the number of the slots is written in the beacon so as to report it to the information transmitter and the surrounding radio communication devices.

Then, the increased number of receiving slots may carry out a reception process so as to receive many information data in a short period of time.

It should be understood that the ACK information for confirming the receipt may be written in the beacon signal so as to be returned to the communication transmitter device.

Further, a receiving slot to be added may be synchronized with a slot by which the transmitter is transmitting the beacon.

After completion of a series of information receptions, by reducing the increased number of receiving slots, the communication receiver device 100R controls the receiving slots so that they are repeatedly used between another radio communication device and itself.

Figure 6:
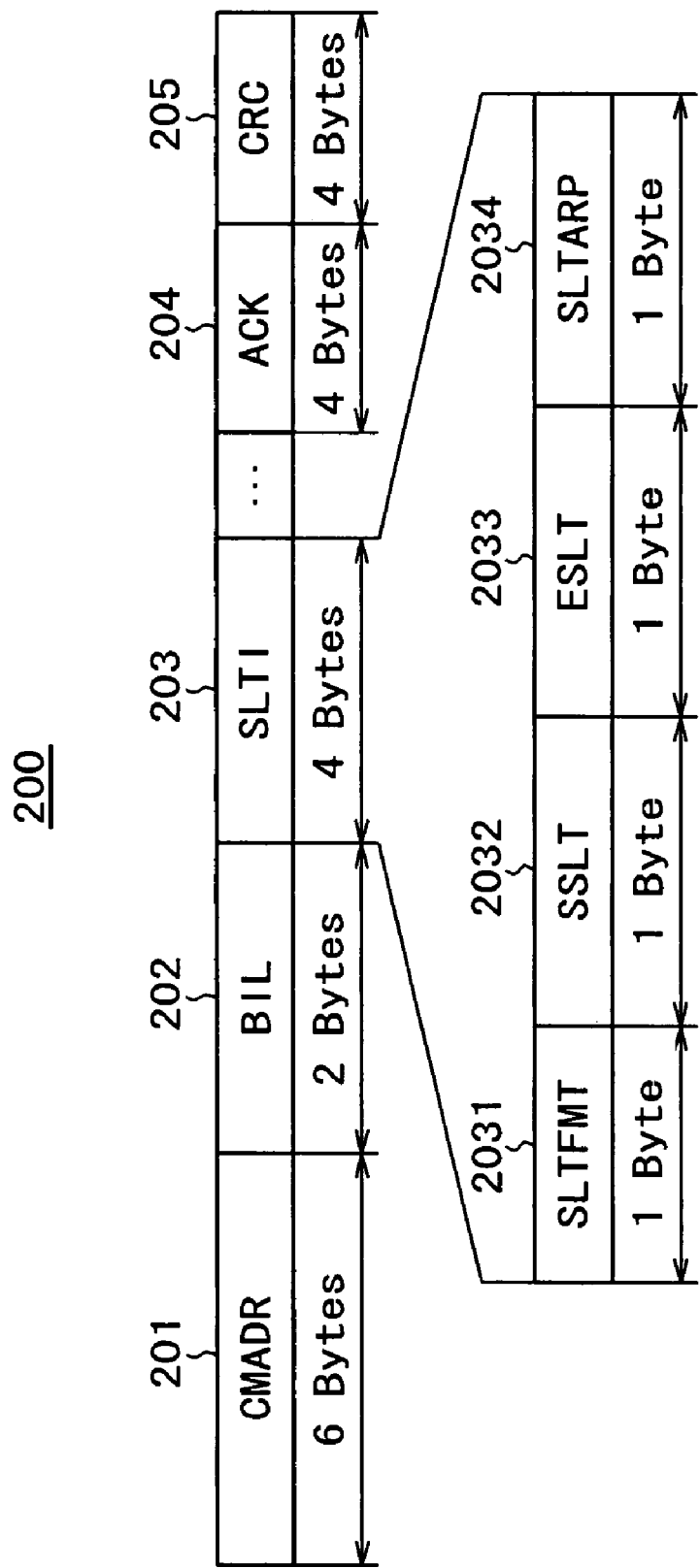
FIG. 6 is a diagram showing an example of structure of the beacon information according to a preferred embodiment of the present invention.

FIG. 6 is a diagram showing an example of structure of the beacon information according to a preferred embodiment of the present invention.

The beacon information 200 includes data of a communication device MAC address (CMADR) 201 used for identifying the radio communication device which transmits the beacon, a beacon information length (BIL) 202 which shows a data length of the beacon information, and slot-in-use information (SLTI) 203 which indicates at least one receiving slot position.

The slot-in-use information 203 permits a plurality of settings if necessary.

Further, ACK information 204 according to the radio communication method of the preferred embodiment of the present invention includes data of a CRC 205 for performing error detection with respect to these data etc.

The ACK information 204 at this stage is added as needed and therefore may not be used if there is no data reception.

Further, contents of the slot-in-use information 203 include a slot. form (SLTFMT) 2031 for identifying that it is a receiving slot, a start slot position (SSLT) 2032 which shows a start position of the slots to be used, an end slot position (ESLT) 2033 which shows an end position of the slots, and a slot arrangement period (SLTARP) 2034 for sparsely distributing the slot positions.

In other words, when one receiving slot is specified, the start slot position and the end slot position are notified as the same slot.

In this case, an approximate value of each information length is indicated for convenience.

FIG. 6 shows that the communication device address (CMADR) 201 has 6 bytes, the beacon information length (BIL) 202 has 2 bytes, and the slot-in-use information (SLTI) 203 has 4 bytes.

Figure 7:
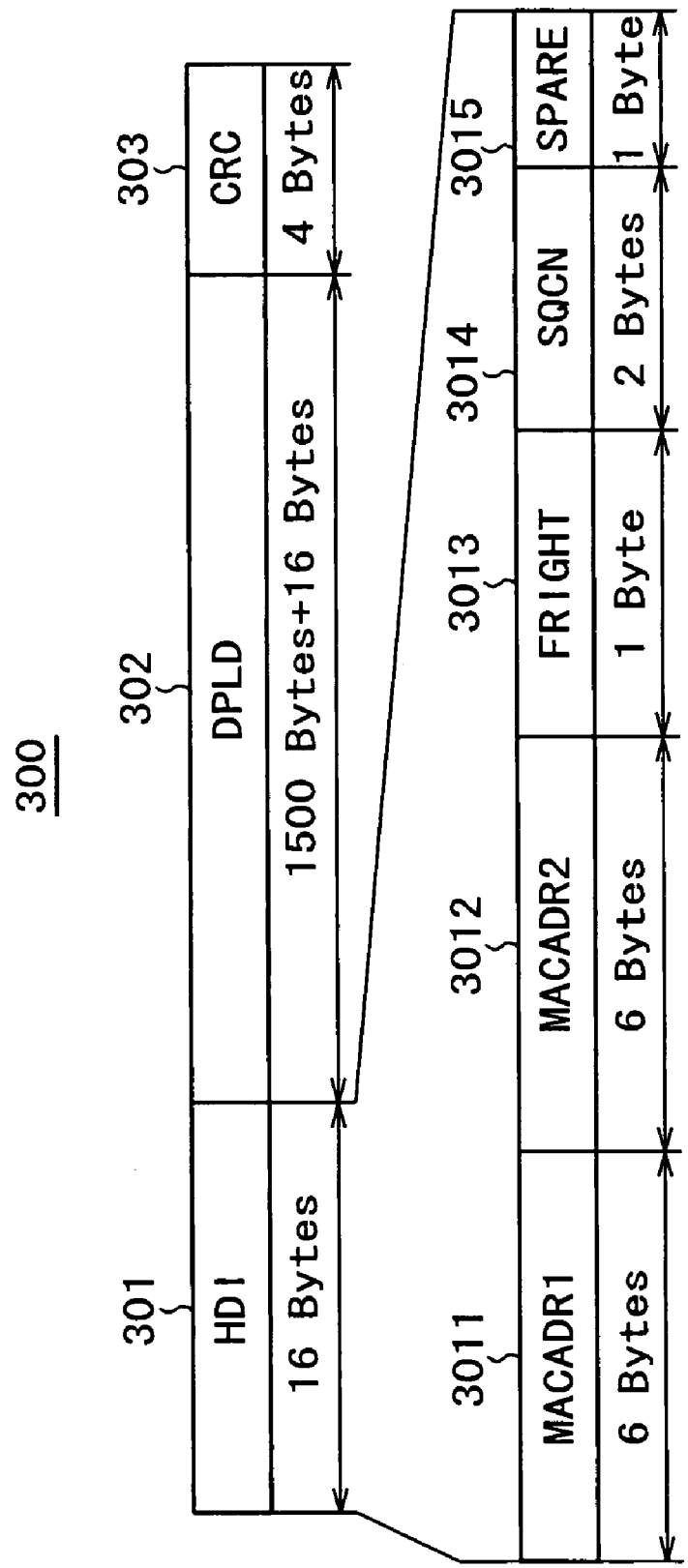
FIG. 7 is a diagram showing an example of structure of data information according to a preferred embodiment of the present invention.

FIG. 7 is a diagram showing an example of structure of data information according to a preferred embodiment of the present invention.

The data information 300 includes an MAC header information (HDI) 301 for indicating an attribute of data, a data payload (DPLD) 302 to be actually transmitted as a user data, an attached CRC 303 for error detection of those data, etc.

Further, the MAC header information 301 includes an information transmitter MAC address (MACADR1) 3011 for identifying a communication device to be the information transmitter, an information receiver MAC address (MACADR2) 3012 for identifying a communication device to be the information receiver, fragment information (FLGMNT) 3013 indicating its data fragment condition, a sequence number (SQCN) 3014 for identifying a transmission order of the data, and a spare area (PRE) 3015 for future extension.

In this case, an approximate value of each information length is indicated for convenience.

FIG. 7 shows that the MAC header information (HDI) 301 has 16 bytes, and the data payload (DPLD) 302 is assumed to be approximately 1500 bytes as a size for suitably transmitting an IP packet.

Figure 8:
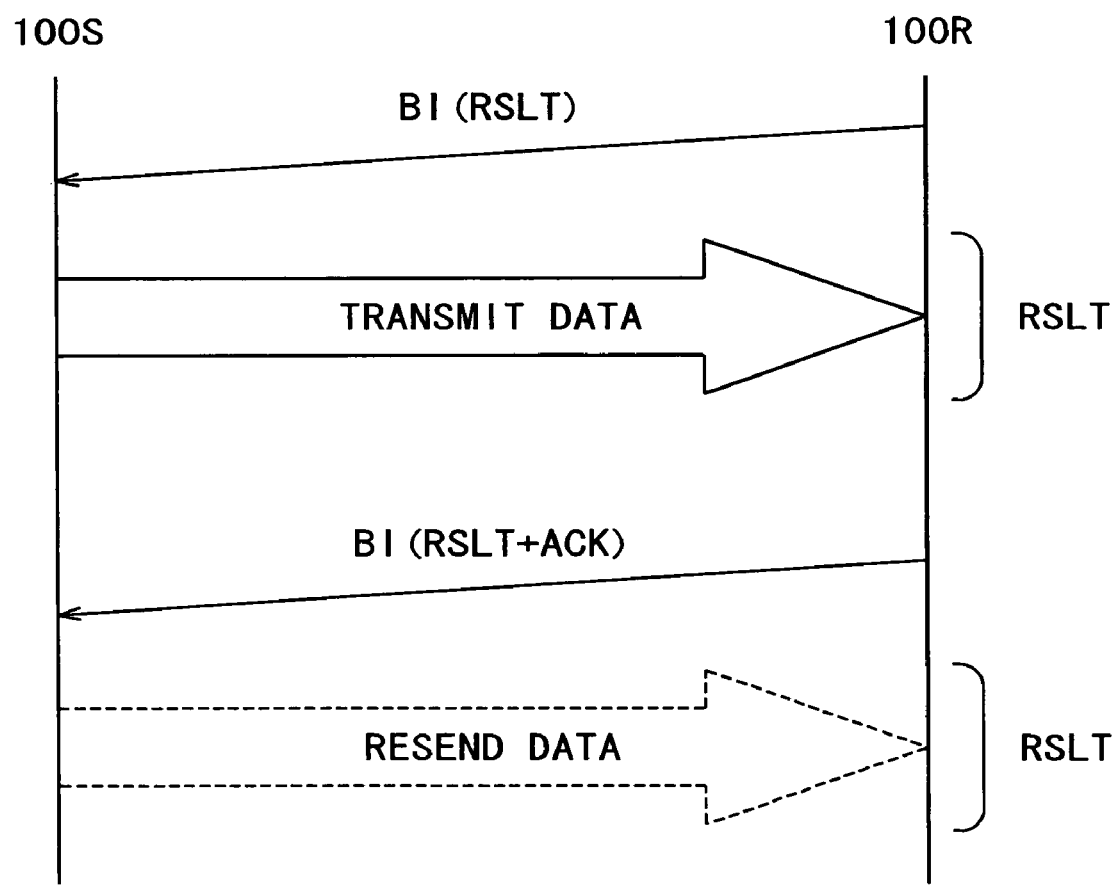
FIG. 8 is a chart for explaining an example of ACK return and resending control according to a preferred embodiment of the present invention.

FIG. 8 is a chart for explaining an example of ACK return and resending control according to the preferred embodiment of the present invention.

Here, it shows a flow of information exchanged between the information communication transmitter device 100S and the information communication receiver device 100R.

The information communication transmitter device 100S receives the beacon information BI from the information communication receiver device 100R and determines the position of the receiving slot RSLT in the information communication receiver device 100R.

Then, it transmits the data in the position (timing) of the receiving slot RSLT.

When receiving the data in the receiving slot RSLT, the information communication receiver device 100R returns the following beacon information BI to which the ACK information indicating the reception acknowledgement of the data is added.

Further, the information communication transmitter device 100S receives the beacon information BI from the information communication receiver device 100R and resends the data in the position (timing) of the receiving slot RSLT if its ACK information requires the resending.

Thus, the information communication transmitter device 100S may only receive the beacon information BI from the information communication receiver device 100R so as to collect the position information of the receiving slot RSSLT and the ACK information at the same time.

Figure 9:
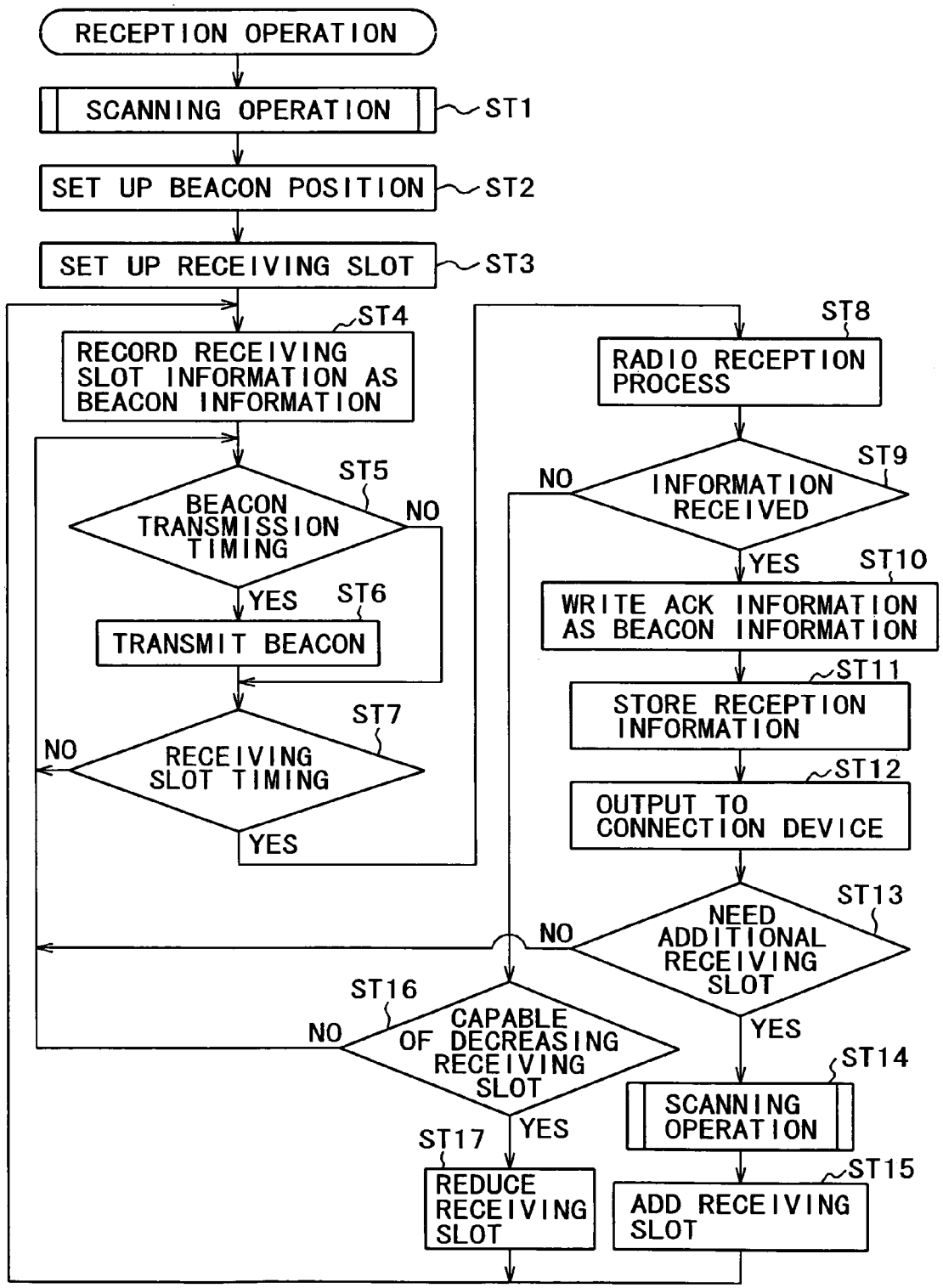
FIG. 9 is a flow chart for explaining reception operation of the radio communication device according to a preferred embodiment of the present invention.
Figure 10:
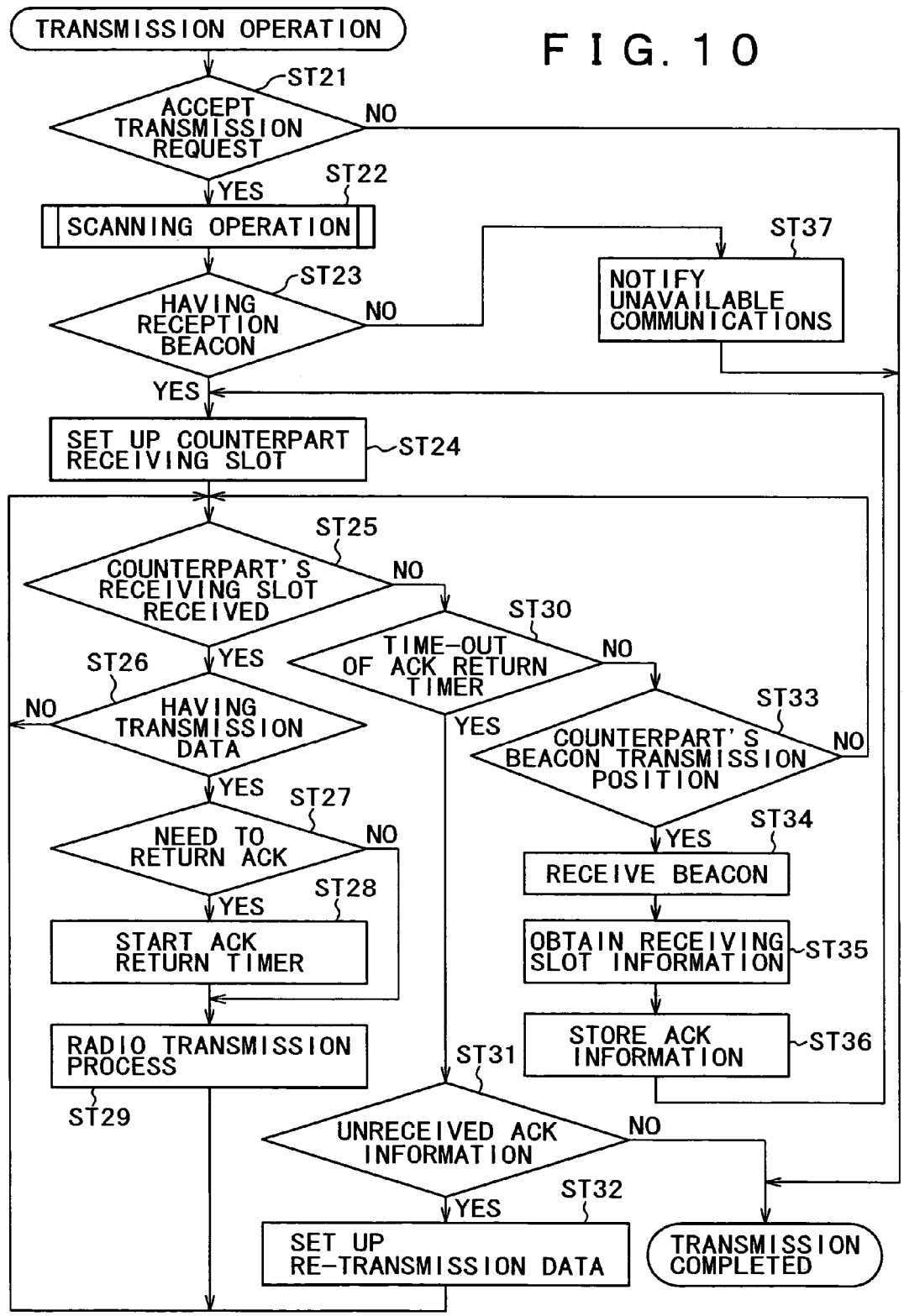
FIG. 10 is a flow chart for explaining transmitting operation of the radio communication device according to a preferred embodiment of the present invention.
Figure 11:
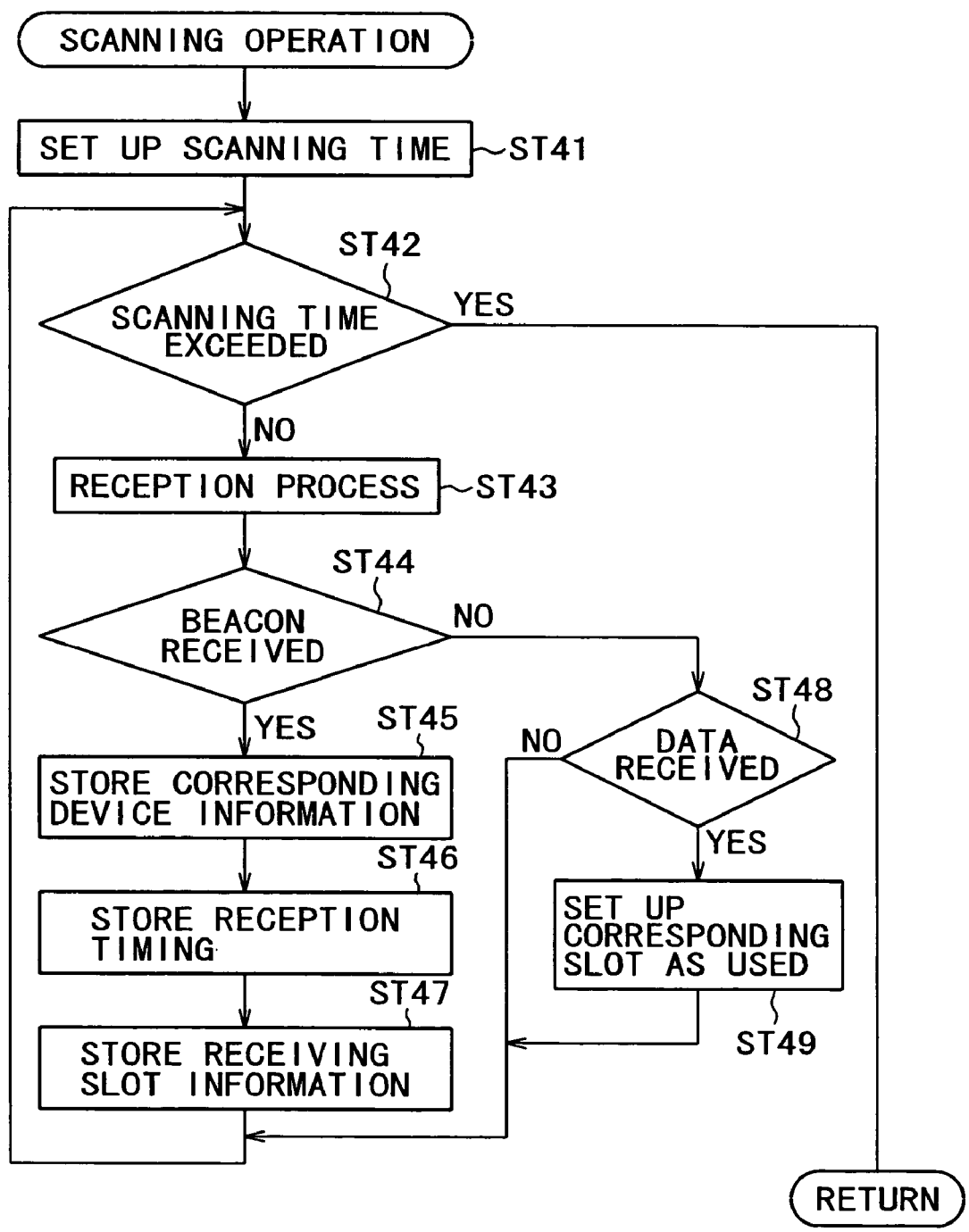
FIG. 11 is a flow chart for explaining scanning operation of the radio communication device according to a preferred embodiment of the present invention.

Now, with reference to flow charts of FIG. 9, FIG. 10, and FIG. 11, a wireless reception operation, the wireless transmitting operation and a scanning operation in the radio communication device 100 having the above structure will be describe in order.

With reference to the flow chart of FIG. 9, the wireless reception operation will be described.

Here, a series of operations after turning on a power source in the radio communication device are shown.

Firstly, after turning the power source on, the scanning operation is performed (step ST1), the beacon transmitting position is set up (step ST2) at the timing of avoiding a collision with the beacon position and the receiving slot of other surrounding radio communication devices, and the receiving slot position is set up (step ST3).

The receiving slot RSLT at this stage may set up at least one receiving slot.

Then, the set-up receiving slot information is written as information on the beacon (step ST4), and it is determined whether or not the beacon transmitting timing has come (step ST5). When the timing comes, the beacon transmitting process is performed (step ST6). When the beacon transmitting timing has not come, the process moves to the processing of step ST7.

In step ST7, it is determined whether or not the timing of the receiving slot has come. When the timing comes, a radio reception process is performed (step ST8). When the timing of the receiving slot has not come, the process moves to the process in step ST5, and a series of waiting processes of beacon transmission and the reception in the receiving slot are repeated.

As a result of the reception process in the receiving slot (step ST9), when there is an information reception, the ACK information is written as the beacon information, for example (step ST10), and the received information is stored in the reception buffer 113 (step ST11). Subsequently, when predetermined data are collected, the data are outputted through the interface 101 to the device to be connected (step ST12).

Further, in step ST13 it is determined whether or not an additional receiving slot is necessary.

At this stage, in case it is necessary to add a receiving slot, such as a case of continuity from the fragment information of the received information etc., the process moves to the scanning operation (step ST14). After searching for a free slot, a receiving slot is added (step ST15).

Then, the process goes to the process in step ST4, the added receiving slot is written as the beacon information, which is notified to the information communication transmitter device and the surrounding communication devices.

If it is not necessary to add a receiving slot, the process moves to the process in step ST5, and the series of waiting processes of the beacon transmission and the reception in the receiving slot are repeated.

Further, as a result of the reception process in the receiving slot (step ST9), if there is no information reception, it is determined whether or not it is possible to reduce the receiving slots (step ST16).

At this stage, in case it is possible to reduce the receiving slots, such as a case where the data reception by increasing the number of the receiving slots is completed, the receiving slots are reduced (step ST17). Then the process moves to the process of step ST4, and the fact that its own receiving slots have been released is written as the beacon information and notified to the surrounding communication devices.

Now, with reference to the flow chart of FIG. 10, the wireless transmitting operation will be described.

Here, a series of operations are described which are started by receiving an information transmission request from the device to be connected to the radio communication device.

Firstly, it is determined whether or not the information transmission request from the device to be connected to the radio communication device 100 has been received (step ST21).

At this stage, when the information transmission request is received, the scanning operation is performed in order to search for the receiving slot in the radio communication device of the counterpart which receives the information (step ST22).

It is determined whether or not the beacon of the radio communication device of the counterpart has been received (step ST23). If the beacon information is stored, the timing of the receiving slot of the radio communication device to be the counterpart is set up (step ST24).

At this stage, it is determined whether or not the timing of the receiving slot of the counterpart has come (step ST25) so as to determine whether or not the data to be transmitted is in the transmission buffer 102 (step ST26).

If there is the data to be transmitted in the transmission buffer 102, it is determined whether or not it is necessary to return the ACK information with respect the data (step ST27). Only when the return is required, the ACK return timer is started so as to prepare for the ACK return from the counterpart (step ST28).

Then, the wireless transmitting operation is performed (step ST29). Subsequently, the process returns to the process in step ST25. The timing of the receiving slot of the radio communication device to be the counterpart again is determined.

Further, in the determination in step ST26, when there is no data to be transmitted in the transmission buffer, the process also returns to the process of step ST25. The timing of the receiving slot of the radio communication device which serves as the counterpart again is determined.

According to the determination in step ST25, if it is not the timing of the receiving slot of the radio communication device to be the counterpart, it is determined whether the ACK return timer set up at the time of the transmission has timed out (step ST30).

At this stage, when it timed out, the ACK checks whether or not there is unreceived information (step ST31). When there is unreceived information, the unreceived information is set up as a data to be retransmitted (step ST32).

If there is no unreceived information, it means that all data have been sent, so that the series of transmitting processes are ended.

According to the determination in step ST30, if the ACK return timer has not timed out, it is determined whether or not the beacon transmitting timing of the counterpart radio communication device has come (step ST33).

When the beacon transmitting timing comes, the reception process of the beacon signal is performed (step ST34) and the receiving slot information is obtained (step ST35). Further, if the ACK information is added, the ACK information is stored (step ST36).

Then, the process goes to the process in step ST24 so as to set up again a timing which has become the receiving slot of the counterpart radio communication device.

According to the determination in step ST33, if the beacon transmitting timing has not come, the process returns to the process in step ST25, so that the timing of the receiving slot of the radio communication device to be the counterpart again is determined.

Further, according to the determination in step ST23, when the beacon signal of the radio communication device to be the receiver is undetectable, a notice of unavailable communication is sent back to the device to be connected which transmitted the transmission request (step ST37), and the series of processes are interrupted.

According to the determination in step ST21, if the information transmission request has not been received, the series of transmitting processes are not started and the processes are not performed.

Now, with reference to the flow chart of FIG. 11, the scanning operation of the radio communication device will be described.

Here, the scanning operation is started in the case of setting up the beacon transmitting position and the receiving slot position as its own frame period when turning the power source on, in the case of confirming the position of the receiving slot of the counterpart before performing the information transmission, or in the case of confirming the slot to be free with respect to surrounding radio communication devices before increasing the number of the receiving slot.

Firstly, a scanning time is set up (step ST41) and it is determined whether or not the scanning time has exceeded (elapsed) (step ST42).

If the scanning time has not elapsed, the reception process for the beacon signal etc. is performed (step ST43), and it is determined whether or not the beacon signal from the surrounding radio communication devices has been received (step ST44).

At this stage, if the beacon is received, corresponding device information (MAC address information) is stored (step ST45), and a reception timing of the beacon is stored (step ST46). Further, information on the receiving slot is stored (step ST47).

Then, the process returns to the process in step ST42 so as to determine whether or not the scanning time has elapsed, and the reception operation is continued until the time elapses.

According to the determination in step ST44, when the beacon signal has not been received, it is determined whether any data has been received (step ST48). When the data is received, its slot position is set up as used (step ST49) so as not to be specified as the beacon transmitting timing and the timing of the receiving slot of its own radio communication device.

Then, the process returns to the process of step ST42, either in the case of not receiving any data, it is determined whether the scanning time has elapsed, and the reception operation is continued until the time elapses.

Subsequently, according to the determination in step ST42, when the scanning time elapses, the series of scanning processes are ended.

As described above, according to the preferred embodiment of the present invention, without performing the channel reservation as in the conventional radio communication system, an arbitrary radio communication may be carried out with other surrounding radio communication devices by setting up the receiving slot according to the amount of receiving data; each radio communication device may only manage the number of its own receiving slots so as to secure the channel required for communication by its own determination without needing a process which is accurately synchronous with other radio communication devices; also the radio communication device on the data transmission side monitors, by receiving the beacon, the increase in the number of the receiving slots of the radio communication device on the reception side so as to transmit the data immediately when the receiving slots increases in the number; and the reception acknowledgement (ACK) information from the reception side radio communication device is written in the beacon and returned, to thereby reduce unnecessary traffic on the opposite direction, and therefore the following effects may be provided:

By managing the receiving slots autonomously, the device to be the base station or the access point may become unnecessary, so that time division multiplexing transmission may be carried out efficiently in an asynchronous radio network.

There is an advantage that the communication device to be the receiver manages the presence of communication in the receiving slot, so that independent management may be carried out only by the receiver device and it is not necessary to perform the channel reservation process by means of bidirectional communication which are used for the conventional channel reservation process.

There is an advantage that it is not necessary to take into consideration the influence of communication path disconnection during the channel reservation process, which may happen in the conventional channel reservation process and it is not necessary to specify complicated connection processes.

It becomes easier to perform the control such that when there is less volume of data to be transmitted, the notice of reservation for a fewer number of receiving slots is carried out, and when there are a greater volume of data to be transmitted, the notice of reservation for a greater number of receiving slots is carried out, whereby devices different in transmission capacity depending on applications may be accommodated in the same wireless transmission channel.

Without knowing the amount of the data transmitted by the application connected in advance, the radio communication device may perform the reservation control closed only in the internal layer of the radio communication device.

Further, there is an advantage that when transmitting the application in which its amount of transmission is fluctuated, the reservation process can be performed easily without determining the amount of reservation in advance.

Still further, when the information from the radio communication device is received, by notifying the reception acknowledgement (ACK) by means of the beacon, the information communication transmitter device may only receive the beacon information from the information communication receiver device so as to collect the position of the receiving slot and the ACK information at the same time, thus improving an efficiency of the transmission channel and reducing its traffic.

The examples of preferred embodiments of the present invention described in the foregoing specification are for illustrative purposes. Therefore, it is to be understood to those of ordinary skill in the art that any changes, variations, combinations, sub-combinations adaptations, alterations, etc. of the examples of preferred embodiments may be practiced otherwise than as specifically described herein without departing from the scope and spirit of the present invention.

What is claimed is:

1. A radio communication apparatus for radio-communicating with another radio communication apparatus, comprising:
   frame setting means for setting a frame period and a slot as predetermined time units;
   receiving slot setting means for setting at least one receiving slot among a plurality of receiving slots received during said frame period;
   notification means for notifying information of said receiving slot set by said receiving slot setting means via a beacon signal; and
   slot increasing means for adding an additional receiving slot, when receiving a signal from another radio communication apparatus at said receiving slot,
   said additional receiving slot being synchronized with the beacon signal, and
   said beacon signal having identifying information which identifies the radio communication apparatus which transmitted the beacon signal, length information which indicates a length of the beacon signal, and slot information which indicates a receiving slot position.

2. A radio communication apparatus for radio-communicating with another radio communication apparatus, comprising:
   receiving means for receiving a beacon signal from another radio communication apparatus;
   receiving slot detection means for detecting a receiving slot of said other radio communication apparatus from said received beacon signal; and
   slot increasing means for increasing a number of receiving slots at a timing that does not coincide with the receiving slot detected by said receiving slot detection means,
   said beacon signal having identifying information which identifies the radio communication apparatus which transmitted the beacon signal, length information which indicates a length of the beacon signal, and slot information which indicates a receiving slot position.

3. A radio communication apparatus for radio-communicating with another radio communication apparatus, comprising:
   frame setting means for setting a frame period and a slot as predetermined time units;
   receiving slot setting means for setting a plurality of receiving slots received during said frame period;
   notification means for notifying information of said receiving slot set by said receiving slot setting means via a beacon signal; and
   slot decreasing means for decreasing said plurality of receiving slots to a minimum of one, when there is no signal reception from another radio communication apparatus at said receiving slot set by said receiving slot setting means,
   said beacon signal having identifying information which identifies the radio communication apparatus which transmitted the beacon signal, length information which indicates a length of the beacon signal, and slot information which indicates a receiving slot position.

4. A radio communication apparatus for radio-communicating with another radio communication apparatus, comprising:
   receiving means for receiving a beacon signal from another radio communication apparatus;
   receiving slot detection means for detecting a receiving slot of said another radio communication apparatus from said received beacon signal; and
   transmitting means for transmitting information via a new receiving slot when a change occurs at said receiving slot, after information is transmitted against a receiving slot of said another radio communication apparatus,
   said beacon signal having identifying information which identifies the radio communication apparatus which transmitted the beacon signal, length information which indicates a length of the beacon signal, and slot information which indicates a receiving slot position.

5. A radio communication apparatus for radio-communicating with another radio communication apparatus, comprising:
   frame setting means for setting a frame period and a slot as predetermined time units;
   receiving slot setting means for setting at least one receiving slot among a plurality of receiving slots received during said frame period; and
   notification means for notifying information of said receiving slot set by said receiving slot setting means via a beacon signal, wherein
   said notification means notifies a reception acknowledgment when receiving a signal from another radio communication apparatus at said receiving slot set by said receiving slot setting means via a beacon,
   said beacon signal having identifying information which identifies the radio communication apparatus which transmitted the beacon signal, length information which indicates a length of the beacon signal, and slot information which indicates a receiving slot position.

6. A radio communication method for performing radio communication between a user's radio communication apparatus and a plurality of radio communication apparatuses, the method comprising the steps of:

setting a frame period of predetermined time through a radio communication apparatus;

preparing a slot of predetermined time unit during the frame period set in said setting step;

setting at least one receiving slot through each of said radio communication apparatuses;

notifying information of said receiving slot set in the setting step via a beacon signal; and adding an additional receiving slot in the user's radio communication apparatus, when there is reception at said receiving slot set in said setting step, said beacon signal having identifying information which identifies the radio communication apparatus which transmitted the beacon signal, length information which indicates a length of the beacon signal, and slot information which indicates a receiving slot position.

7. A radio communication method for performing radio communication between a user's radio communication apparatus and a plurality of radio communication apparatuses, the method comprising the steps of:

setting a frame period of predetermined time through a radio communication apparatus;

collecting a beacon from another adjacent radio communication apparatus through a receiving operation performed throughout said frame period set in said setting step;

storing receiving slot information of said other adjacent radio communication apparatus from said beacon; and increasing receiving slots of the user's radio communication apparatus at a timing that does not coincide with said receiving slots stored by said storing step, said beacon having identifying information which identifies the radio communication apparatus which transmitted the beacon, length information which indicates a length of the beacon, and slot information which indicates a receiving slot position.

8. A radio communication method for performing radio communication between a user's radio communication apparatus and a plurality of radio communication apparatuses, the method comprising the steps of:

setting the frame period of predetermined time through a radio communication apparatus;

preparing a slot of predetermined time unit during the frame period set in said setting step;

setting a plurality of receiving slots for data reception through each of said radio communication apparatuses;

notifying information of said receiving slot set in the setting step via a beacon signal;

decreasing receiving slots of the user's radio communication apparatus to a minimum of one, when there is no reception by said receiving slots set in said setting step, said beacon signal having identifying information which identifies the radio communication apparatus which transmitted the beacon signal, length information which indicates a length of the beacon signal, and slot information which indicates a receiving slot position.

9. A radio communication method for performing radio communication between a plurality of radio communication apparatuses, the method comprising the steps of:

setting a frame period of predetermined time through a radio communication apparatus;

collecting a beacon from another adjacent radio communication apparatus through a receiving operation performed throughout said frame period set in said setting step;

storing receiving slot information of said another adjacent radio communication apparatus from said beacon;

receiving a beacon signal from a radio communication apparatus when information is transmitted by a receiving slot of said radio communication apparatus; and transmitting information via another receiving slot, when a change occurs in an allocation of a receiving slot, said beacon having identifying information which identifies the radio communication apparatus which transmitted the beacon, length information which indicates a length of the beacon, and slot information which indicates a receiving slot position.

10. A radio communication method for performing radio communication between a plurality of radio communication apparatuses, the method comprising the steps of:

setting a frame period of predetermined time through a radio communication apparatus;

preparing a slot of predetermined time unit during the frame period set in said setting step;

setting at least one receiving slot through each of said plurality of radio communication apparatuses;

notifying a position of said receiving slot set in said setting step via a beacon; and notifying reception acknowledgment, when receiving a signal from another radio communication apparatus, said beacon having identifying information which identifies the radio communication apparatus which transmitted the beacon, length information which indicates a length of the beacon, and slot information which indicates a receiving slot position.

* * * * *